Patented Sept. 18, 1934

1,973,833

UNITED STATES PATENT OFFICE 1,973,833

REFINING OF CRUDE PARAFFIN WAX

Rudolf Wietzel, deceased, late of Ludwigshafen-on-the-Rhine, by Else Wietzel, administratrix, Wilhelmshorst, Germany, and Conrad Pfaundler, Oppau, Germany, assignor to Standard-I. G. Company, Linden, N. J., a corporation of Delaware No Drawing. Application May 22, 1933, Serial No. 672,228. In Germany April 26, 1928

9 Claims. (Cl. 196—21)

The present application is a continuation-in-part of our application Ser. No. 340,008, filed February 14th, 1929, and relates to improvements in the refining of crude paraffin wax.

For many purposes, such as for conversion into oxidation products, crude paraffin wax is, for the most part, not directly suitable, but must first be subjected to a troublesome refining process for the removal of injurious impurities.

We have now found that crude paraffin wax can be refined in a very simple manner and rendered directly suitable for all purposes, which require a pure paraffin wax, by contacting it, in the liquid form, with hydrogen or gases containing or supplying hydrogen, at elevated temperatures, preferably between about 300° and 400° C., and at an elevated pressure, the duration of the treatment and the temperature being regulated in such a way that the paraffin wax itself suffers substantially no cracking, that is to say splitting up into low molecular liquid products. For example, pressures of 10, 20, 50 or 100 atmospheres may be employed or usually even higher pressures, such as those ranging between 100 and 250 atmospheres. In this manner, pure products which are solid at ordinary temperature, are obtained directly. Temperatures between 350° and 390° C. have been found particularly suitable for the process. The duration of treatment of the paraffin wax must be shortened as the temperature is increased in order to avoid a substantial cracking of the wax. The said regulation of the treatment may be effected either by increasing or decreasing the rate of flow of the materials in cases where the materials are passed through a reaction vessel or by simply stopping the treatment in cases where it is carried out in autoclaves. As a general rule the following upper limits may be given for treatments carried out without the employment of catalysts:

375° C. more than 10 hours
400° C. about 10 hours
425° C. about 1 hour
450° C. about 5 minutes.

If catalysts be employed the treatment may be shortened.

It should be understood, however, that our invention is not limited to these specific durations of treatment but that the duration of treatment may be increased or decreased.

It is advantageous to employ catalytic substances in the process, especially such as contain one or more non-volatile compounds and in particular oxides or sulphides of the metals of groups 3, 4 or 6 of the periodic system, and catalytic substances containing molybdenum, for example, have proved highly suitable. When molybdic acid, or a catalytic substance containing molybdenum oxides, is employed a partial reduction, for example to $MoO_2$ or to metal, occurs during the process. The efficacy of the catalysts can be increased by additions of small amounts of activating substances, such as those comprising iron, cobalt or nickel which are hereinafter referred to as "metal of the iron group". The following typical examples of catalysts may be mentioned as suitable for the process:

2 parts of molybdenum trioxide, 2 parts of nickel oxide and 1 part of alumina.

4 parts of molybdenum trioxide, 2 parts of nickel oxide and 1 part of alumina.

8 parts of molybdenum trioxide, 1 part of zirconium oxide and 1 part of alumina.

6 parts of molybdenum dioxide, 0.3 part of chromic oxide and 5 parts of alumina.

2.5 parts of molybdenum dioxide, 1 part of nickel oxide and 10 parts of silica gel.

1.5 parts of molybdenum trioxide, 2 parts of nickel oxide and 10 parts of silica gel.

2 parts of molybdenum trioxide, 0.1 part of chromic oxide and 1 part of cerium oxide.

10 parts of aluminium oxide and 1 part of chromic oxide.

6 parts of zirconium oxide and 1 part of chromic acid.

30 parts of zirconium oxide and 1 part of molybdenum trioxide.

4 parts of molybdenum sulphide, 1 part of aluminium oxide.

5 parts of molybdenum sulphide, 1 part of silica gel.

5 parts of tungsten sulphide, 1 part of nickel sulphide, 2 parts of aluminium oxide.

4 parts of molybdenum sulphide, 1 part of cobalt sulphide, 2 parts of kieselguhr.

3 parts of molybdenum sulphide, 1 part of nickel sulphide, 5 parts of silica gel.

4 parts of tungsten sulphide, 1 part of nickel sulphide, 1 part of aluminium oxide.

The above proportions may be varied considerably without departing from the essence of the present invention.

The catalysts may be employed in the form of powder intimately mixed with the initial material prior to the treatment with hydrogen under pressure, and at the end of this treatment they are separated from the paraffin hydrocarbons for example by filtering or centrifuging the product, and are then available for the refining of further initial material. The catalysts may, however, be disposed, separately, in a coarse form in the reaction chamber, the molten paraffin wax being then passed over them with a counter- or equidirectional flow of hydrogen.

It is advisable to pump the hydrogen continuously and/or in a cycle through the charge, and to mix the gas thoroughly therewith in any known and suitable manner and to free the circulating gas from the gaseous or vaporous by-products, such as hydrogen sulphide, formed during the reaction. The duration of the reaction period depends on the working temperature, the nature of the catalytic substance chosen and the kind of apparatus employed, and can be ascertained in each case by a small test. Unduly protracted exposure, even at temperatures of 350° to 390° C. leads to undesirable decomposition and hence to a lowered melting point of the paraffin wax.

Under the working conditions described, the paraffin waxes present suffer no substantial change, if any, the impurities which often impart a dirty and dark-colored appearance to the crude product, alone being decomposed. The paraffin wax becomes lighter in color and in some cases perfectly snow-white and almost odorless, the sulfur content and that of unsaturated compounds in particular being reduced. The melting point remains practically the same, and in some cases is even raised a little by the removal of the impurities. The crude paraffin wax which has been treated in this manner is suitable for direct conversion into fatty acids and refined products by oxidation with oxygen or other oxidizing agents.

The process according to this invention may be applied to the treatment of, for example, paraffin wax derived from tar oils, petroleum oils, the products of the extraction or destructive hydrogenation of coal and the like. These products may also still contain other substances, such as tar oils and the like, in addition to paraffin wax.

The following examples will further illustrate the nature of the invention, which however is not restricted thereto.

Example 1

Brown paraffin scale is treated with hydrogen at about 375° C. and at a pressure of about 200 atmospheres in a pressure-tight tube lined with chromium-nickel steel or aluminium and in the presence of a catalyst composed of 6 parts of molybdenum dioxide, 0.3 part of chromium oxide and 5 parts of aluminium oxide, the treatment being carried out only for such a period of time that no substantial decomposition of the paraffin wax occurs. The hydrogen is admitted through perforated plates in a state of fine distribution in order to ensure intimate contact of the gas with the material to be treated and with the catalytic substance, and the escaping gas is returned to the process. The resulting refined paraffin wax is white and almost odorless. The sulphur content has fallen from 0.26 per cent to 0.003 per cent by weight of the wax, the iodine value from 43 to 1.6, and the melting point has risen from 52.5° to 53° C. The product can be readily oxidized with air, at elevated temperature, to valuable esters, fats and the like.

Example 2

Crude paraffin wax, with a melting point of 52.8° C., obtained in the destructive hydrogenation of brown coal, is treated with hydrogen at about 370° C. in a stirrer autoclave at a pressure of about 200 atmospheres for such a period of time that no substantial decomposition of the paraffin occurs, said treatment being carried out in the preesnce of a finely divided catalytic substance consisting of 100 parts of zirconium oxide, 3 parts of molybdenum oxide and 1 part of chromic oxide and prepared by precipitating the oxides from solutions of the corresponding salts with ammonia, followed by repeated washings and dryings. This treatment is completed in almost an hour and renders the paraffin wax white and nearly odorless. The melting point is raised to 53.2° C.

Example 3

Crude paraffin wax from brown coal low-temperature carbonization tar containing about 30 per cent of Montan wax is treated in an autoclave fitted with a stirrer in a current of hydrogen at about 380° C. and under a pressure of about 250 atmospheres in the presence of a finely divided catalyst. The said catalyst consists of 6 parts of finely ground kieselguhr, 2 parts of alumina gel, 1 part of molybdic acid and 0.1 part of chromic acid and is previously mixed with the crude paraffin wax in a turbo mixer. The product thus obtained is yellowish-white to pure white in color and is free from Montan wax.

Example 4

Crude paraffin wax containing 0.4 per cent of sulphur is treated with streaming hydrogen in a horizontal autoclave provided with stirring means at a temperature of 375° C. under a pressure of 250 atmospheres and in the presence of a finely divided catalyst consisting of a mixture of 4 parts of molybdenum sulphide, 1 part of nickel sulphide and 1 part of aluminum oxide. In this manner a completely white and odorless paraffin wax containing only 0.01 per cent of sulphur and having an iodine value of 0.8 is obtained.

What we claim is:—

1. A process for refining crude paraffin wax of the type usually containing sulphur and unsaturated compounds, which comprises contacting the crude wax in the liquid state with a gas supplying hydrogen at a temperature between about 300° and 400° C. at an elevated pressure sufficient to maintain the wax in the liquid state at the temperature employed and in the presence of a catalyst containing a compound selected from the oxides and sulphides of metals of group 6 of the periodic system for a sufficient length of time to render the wax materially lighter in color without appreciably lowering its molecular weight and thereby lowering its melting point.

2. A process for refining crude paraffin wax of the type usually containing sulphur and unsaturated compounds, which comprises contacting the crude wax in the liquid state with a gas supplying hydrogen at a temperature between about 300° and 400° C. at an elevated pressure sufficient to maintain the wax in the liquid state at the temperature employed and in the presence of a catalyst comprising a non-volatile compound selected from the oxides and sulphides of the metals of group 6 of the periodic system, in conjunction with a corresponding compound of at least one of the metals of groups 3 and 4 of the periodic system for a sufficient length of time to render the wax materially lighter in color without appreciably lowering its molecular weight and thereby lowering its melting point.

3. A process for refining crude paraffin wax of the type usually containing sulphur and unsaturated compounds, which comprises contacting the crude wax in the liquid state with a gas supplying hydrogen at a temperature between about 300° and 400° C. at an elevated pressure sufficient to maintain the wax in the liquid state at the temperature employed and in the presence of a catalyst comprising an oxide of a metal of group 6 of the periodic system with an oxide of at least one of the metals of groups 3 and 4 of the periodic system for a sufficient length of time to render the wax materially lighter in color without appreciably lowering its molecular weight and thereby lowering its melting point.

4. A process for refining crude paraffin wax of the type usually containing sulphur and unsaturated compounds, which comprises contacting the crude wax in the liquid state with a gas supplying hydrogen at a temperature between about 300° and 400° C. at an elevated pressure sufficient to maintain the wax in the liquid state at the temperature employed and in the presence of a catalyst comprising an oxide of a metal of group 6 of the periodic system, in conjunction with an oxide of at least one of the metals of groups 3 and 4 of the periodic system and a small addition comprising a metal from the iron group, for a sufficient length of time to render the wax materially lighter in color without appreciably lowering its molecular weight and thereby lowering its melting point.

5. A process for refining crude paraffin wax of the type usually containing sulphur and unsaturated compounds, which comprises contacting the crude wax in the liquid state with a gas supplying hydrogen at a temperature between about 300° and 400° C. at a pressure of at least 10 atmospheres and in the presence of a substance selected from the group consisting of the oxides and sulphides of the metals of group 6 of the periodic system for a sufficient length of time to render the wax materially lighter in color without appreciably lowering its molecular weight and thereby lowering its melting point.

6. A process for refining crude paraffin wax of the type usually containing sulphur and unsaturated compounds, which comprises contacting the crude wax in the liquid state with a gas supplying hydrogen at a temperature between about 300° and 400° C. at a pressure of at least 10 atmospheres and in the presence of a catalyst comprising a compound selected from the group consisting of the oxides and sulphides of the metals of group 6 of the periodic system, in conjunction with a corresponding compound of at least one of the metals of groups 3 and 4 of the periodic system, for a sufficient length of time to render the wax materially lighter in color without appreciably lowering its molecular weight and thereby lowering its melting point.

7. A process for refining crude paraffin wax of the type usually containing sulphur and unsaturated compounds, which comprises contacting the crude wax in the liquid state with a gas supplying hydrogen at a temperature between about 300° and 400° C. at a pressure of the order used for destructive hydrogenation and in the presence of a substance selected from the group consisting of the oxides and sulphides of the metals of group 6 of the periodic system for a sufficient length of time to render the wax materially lighter in color without appreciably lowering its molecular weight and thereby lowering its boiling point.

8. A process for refining crude paraffin wax of the type usually containing sulphur and unsaturated compounds, which comprises contacting the crude wax in the liquid state with a gas supplying hydrogen at a temperature between about 350° and 390° C. at an elevated pressure sufficient to maintain the wax in the liquid state at the temperature employed and in the presence of a substance selected from the group consisting of the sulphides and oxides of metals of group 6 of the periodic system for a sufficient length of time to render the wax materially lighter in color without appreciably lowering its molecular weight and thereby lowering its melting point.

9. A process for refining crude paraffin wax containing sulphur and unsaturated compounds, which comprises contacting the crude wax in the liquid state with hydrogen at a temperature of about 370° C. and at a pressure of about 200 atmospheres, in the presence of a finely divided catalyst comprising molybdenum oxide and chromium oxide, for about one hour.

ELSE WIETZEL,
*Administratrix of Rudolf Weitzel, Deceased.*
CONRAD PFAUNDLER.